(12) United States Patent
Zhang

(10) Patent No.: US 10,282,473 B2
(45) Date of Patent: May 7, 2019

(54) TASK-CRAWLING SYSTEM AND TASK-CRAWLING METHOD FOR DISTRIBUTED CRAWLER SYSTEM

(71) Applicant: MOLBASE (Shanghai) Biotechnology Co., Ltd., Shanghai (CN)

(72) Inventor: Guo Qiang Zhang, Shanghai (CN)

(73) Assignee: MOLBASE (SHANGHAI) BIOTECHNOLOGY CO., LTD, Shanghai (CN)

( * ) Notice: Subject to any disclaimer, the term of this patent is extended or adjusted under 35 U.S.C. 154(b) by 264 days.

(21) Appl. No.: 15/171,488

(22) Filed: Jun. 2, 2016

(65) Prior Publication Data
US 2017/0068735 A1    Mar. 9, 2017

(30) Foreign Application Priority Data
Sep. 8, 2015    (CN) .......................... 2015 1 0564985

(51) Int. Cl.
*G06F 17/30* (2006.01)
*H04L 29/08* (2006.01)

(52) U.S. Cl.
CPC ........ *G06F 17/30864* (2013.01); *H04L 67/10* (2013.01)

(58) Field of Classification Search
CPC .......................... G06F 17/30864; H04L 67/10
See application file for complete search history.

(56) References Cited

U.S. PATENT DOCUMENTS

| | | | | |
|---|---|---|---|---|
| 6,638,314 | B1* | 10/2003 | Meyerzon | G06F 17/30864 707/999.01 |
| 7,676,553 | B1* | 3/2010 | Laucius | G06F 17/30864 709/219 |
| 8,676,783 | B1* | 3/2014 | Fedorynski | G06F 17/30864 707/709 |
| 2001/0044795 | A1* | 11/2001 | Cohen | G06F 17/30699 |
| 2002/0052928 | A1* | 5/2002 | Stern | G06F 17/30864 709/218 |
| 2003/0037034 | A1* | 2/2003 | Daniels | G06Q 10/087 |
| 2005/0055357 | A1* | 3/2005 | Campbell | G06F 8/61 |
| 2005/0251863 | A1* | 11/2005 | Sima | G06F 21/577 726/25 |
| 2009/0204610 | A1* | 8/2009 | Hellstrom | G06F 17/30 |

(Continued)

*Primary Examiner* — Jay A Morrison
(74) *Attorney, Agent, or Firm* — Muncy, Geissler, Olds & Lowe, P.C.

(57) ABSTRACT

A task-crawling system for a distributed crawler system includes a controlling end, a crawling end, and a task monitoring module. The crawling end acquires a corresponding task, and sends data of the task to the controlling end. The controlling end works for assigning a number to the task, defining a timeout period for the task, generating a task-distribution event, and storing timestamp data of distribution of the task. The controlling end distributes the task distribution to the task monitoring module and the crawling end. The crawling end performs corresponding crawling logic to the crawl task, and sends information about completion of the task to the controlling end. In case of abnormality that prevents the crawl task from being performed properly, the task monitoring module re-pushes the task to the controlling end, thereby avoiding failure of the task otherwise caused by web-related problems.

3 Claims, 2 Drawing Sheets

(56) References Cited

U.S. PATENT DOCUMENTS

| | | | |
|---|---|---|---|
| 2009/0276364 A1* | 11/2009 | Iaia | G06Q 10/02 705/80 |
| 2010/0138485 A1* | 6/2010 | Chow | G06F 17/30902 709/203 |
| 2013/0041881 A1* | 2/2013 | Wierman | G06F 17/30864 707/709 |
| 2013/0144858 A1* | 6/2013 | Lin | G06F 17/30864 707/709 |
| 2014/0067854 A1* | 3/2014 | Simon | G06F 17/30864 707/769 |
| 2014/0129371 A1* | 5/2014 | Wilson | G06Q 30/02 705/26.7 |
| 2014/0222776 A1* | 8/2014 | Zhu | G06F 17/30864 707/709 |
| 2017/0063759 A1* | 3/2017 | McClune | H04L 51/16 |

\* cited by examiner

TASK-CRAWLING SYSTEM AND TASK-CRAWLING METHOD FOR DISTRIBUTED CRAWLER SYSTEM

BACKGROUND OF THE INVENTION

1. Technical Field

The present invention relates to the internet and, more particularly, to a task-crawling system and method for a distributed crawler system.

2. Description of Related Art

With the development of technologies regarding the internet, the number of websites is growing in geometric series. The way search engines crawling websites has been evolved from a single-node manner, a multi-node manner to currently a distributed manner, so as to crawling websites fast, thereby enriching the engines' indexing data and providing better user experience. Since there are many crawling nodes in a distributed crawler system, a central controlling node is required to distribute tasks to corresponding crawling nodes. In this process, there are cases where a crawl task is not properly performed due to, for example, web problems or abnormal operation of the corresponding crawling node. The present invention thus provides a highly reliable solution for distribution and execution of crawl tasks.

SUMMARY OF THE INVENTION

The objective of the present invention is to provide a task-crawling system and method for a distributed crawler system.

For fulfilling the foregoing objective, the present invention implements the following technical schemes.

The present invention first provides a task-crawling system for a distributed crawler system, which comprises:

a controlling end, for creating and distributing a crawl task and for storing a crawl result of the crawl task;

a crawling end, for acquiring the task, requiring target websites, acquiring website data, analyzing the task, and delivering analytic results to the controlling end; and a task monitoring module, for setting crawl time for the task, monitoring and recording crawl progress of the task, and, when not receiving feedback about completion of the task, re-pushing the task to the controlling end.

In the task-crawling system as described above, the controlling end comprises a database for storing data of creation of the task, using Redis to store data of the task and crawl data of sequence, and using MySql to store the crawl result of the crawl task.

In the task-crawling system as described above, the task monitoring module comprises a data-storing device for storing data of the crawl task.

The present invention also provides a task-crawling method for a distributed crawler system that employs the task-crawling system and comprises at least the following steps:

(1) using the crawling end to acquire the task and to send data of the task to the controlling end;

(2) using the controlling end to assign a number to the task, to define a timeout period for the task, to generate a task-distributing event, and to store timestamp data of distribution of the task;

(3) distributing the distribution of the task to the task monitoring module and the crawling end, so that the task monitoring module stores the number of the task, the timeout period of the task and the timestamp data of the distribution of the task, and marks the present task as a task under execution; and (4) using the crawling end to perform corresponding crawling logic to the crawl task, to finish data crawl, and to send information about completion of the task to the controlling end, using the controlling end to store the crawl result of the task, to generate a task success event, and to send the information about completion of the task to the task monitoring module, and using the task monitoring module to delete the data of the task; or (5) when the crawling end fails to complete data crawl, and the task monitoring module has not received the information about completion of the task, using a task-monitoring thread to perform traversal on the data of the task, to compare the timestamp data of the distribution of the task and a present timestamp of the system, and to re-push the task that has not provided feedback to a crawl sequence of the controlling end, thereby returning to Step (2) until the required data crawl is completed.

With the foregoing technical schemes, in case of abnormality after a task is distributed that prevents the crawl task from being performed properly, the task monitoring module can push the task to the controlling end again for re-execution, thereby avoiding failure of the task otherwise caused by web-related problems.

DETAILED DESCRIPTION OF THE INVENTION

The following description, in conjunction with the accompanying drawings and preferred embodiments, is set forth as below to illustrate the present invention.

Embodiment 1

Figure 1:
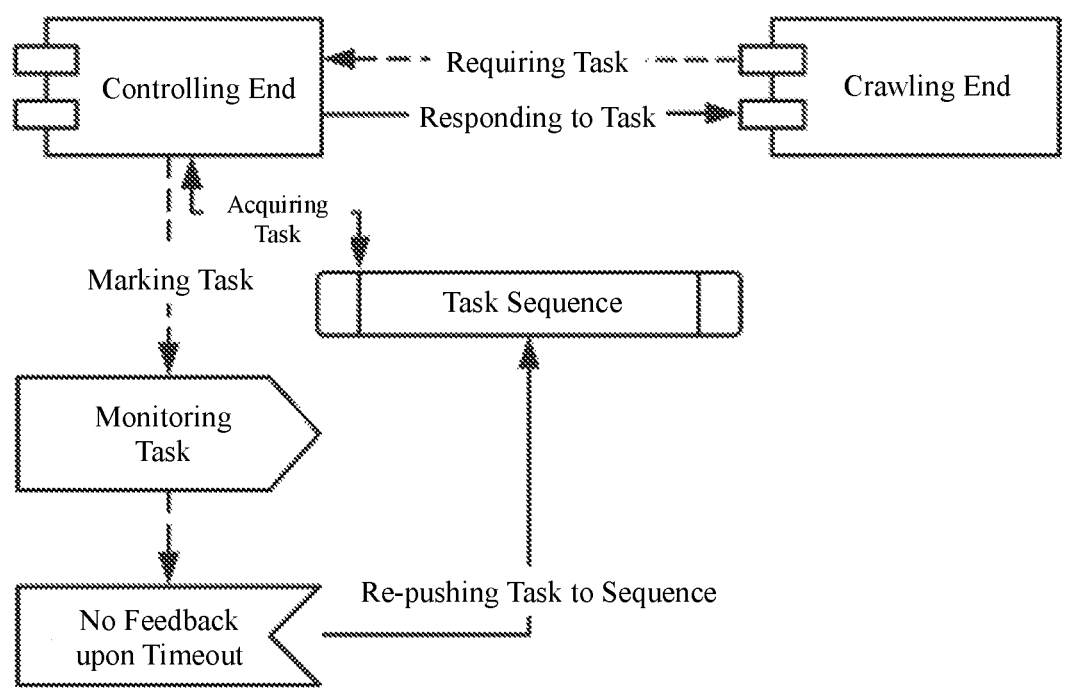
FIG. 1 is a block diagram illustrating the task-crawling system and method for a distributed crawler system according to the present invention.
Figure 2:
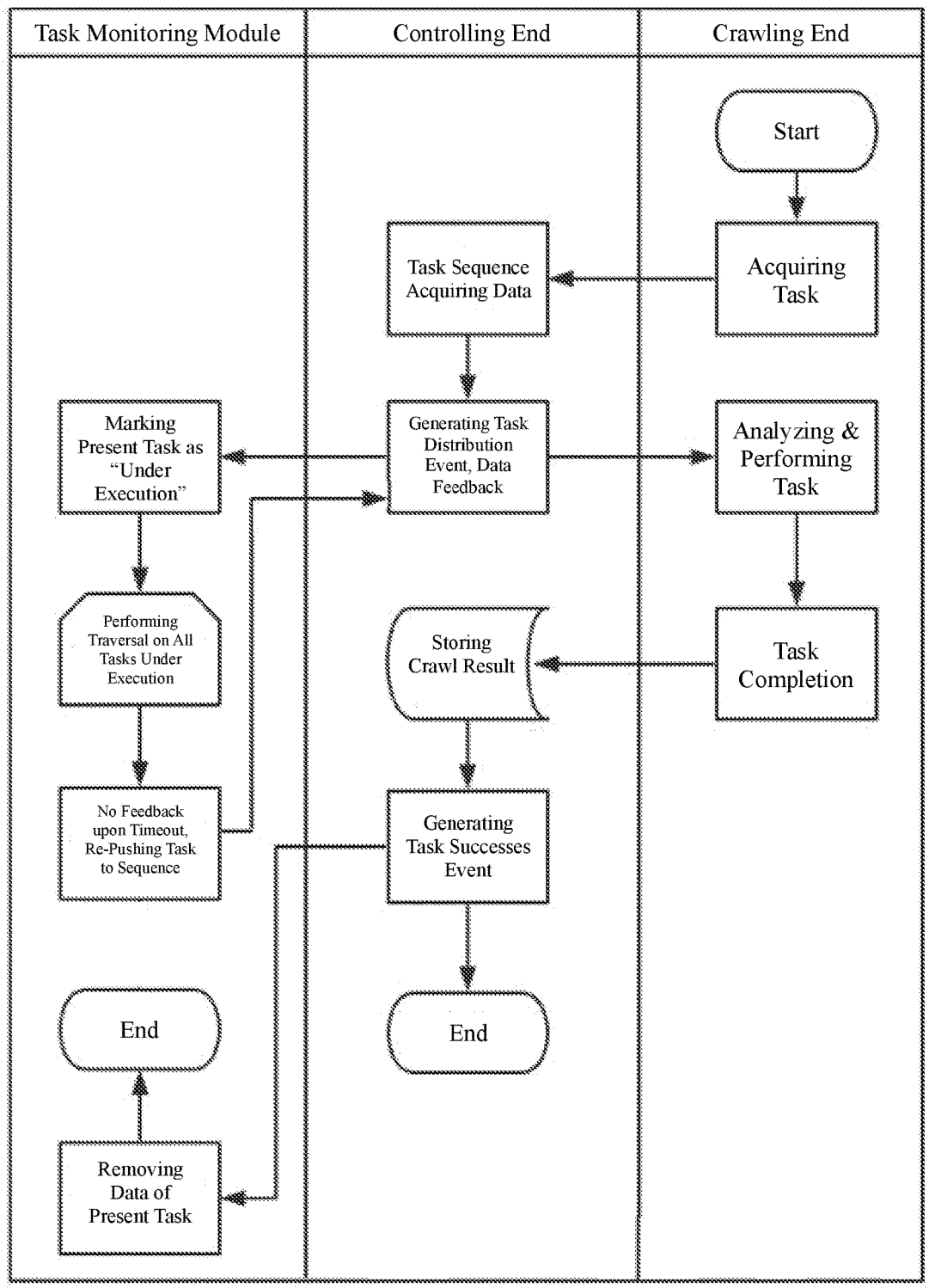
FIG. 2 is a flowchart of the task-crawling system and method of FIG. 1.

Referring to FIG. 1 and FIG. 2, according to the present invention, a task-crawling system for a distributed crawler system comprises the following components.

A controlling end works for creating and distributing a crawl task and for storing a crawl result of the crawl task.

A crawling end works for acquiring the task, requiring target websites, acquiring website data, analyzing the task, and delivering analytic results to the controlling end.

A task monitoring module works for setting crawl time for the task, and monitoring and recording crawl progress of the task. When not receiving feedback about completion of the task, it re-pushes the task to the controlling end.

The controlling end comprises a database for storing data of creation of the task, using Redis to store data of the task and crawl data of sequence, and using MySql to store the crawl result of the crawl task.

The task monitoring module comprises a data-storing device that uses Redis to store data of the crawl task.

The crawling end is connected to the controlling end through Thrift and calls for the corresponding port. The controlling end extracts data of the task form the Redis sequence. Then it completes the corresponding serialized operation and feeds back to the crawling end. At the same time, an event of distribution of the task is thrown inside the controlling end. The task monitoring module processes the task, and stores data into HashSet of Redis, with the number of the task as the key, and the timestamp of distribution of the task as the value.

After the crawl task is distributed to the crawling end, the crawling end performs the corresponding crawling logic and completes data crawl. The result is delivered to the controlling end. When being informed of completion of the task, the controlling end performs works like storing data and cleaning Cache, and generates internally an event related to completion of the task. The task monitoring module processes the event related to completion of the task, and works on the data of the present crawl task, and deletes the corresponding task data.

Embodiment 2

The crawling end acquires the corresponding task and sends data of the task to the controlling end.

The controlling end assigns a number to the task and defines a timeout period for the task. Then it generates an event related to distribution of the task, and stores timestamp data of distribution of the task.

The task is distributed to the task monitoring module and the crawling end. The task monitoring module stores the number of the task, the timeout period for the task and the timestamp data of distribution of the task. Also, it marks the present task as a task under execution.

After distributed, if the task is not performed successfully, the case may be one of the following: (1) a web-related problem prevents the crawling end from receiving the task; (2) the crawling end has errors or crashes during crawl; (3) the crawl task is completed, but information of completion is not delivered to the controlling end due to a web-related problem.

As long as the controlling end has not received the information of completion of the task from the crawling end, removal of the task data from the sequence of crawl tasks is impossible. A task-monitoring thread performs traversal on Hashset of the task, and extracts its timestamp data to compare with a present timestamp of the system. Then it re-pushes the task that has not provided feedback to the Redis crawl sequence for the next round of task distribution until the required data crawl is completed.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A task-crawling system for a distributed crawler system, comprising:
   a controlling end, for creating and distributing a crawl task and for storing a crawl result of the crawl task;
   a crawling end being connected to the controlling end via a network, for acquiring the task, requiring target websites, acquiring website data, analyzing the task, and delivering analytic results to the controlling end; and
   a task monitoring module including a processor and a data-storing device for storing data of the crawl task, for setting crawl time for the task, monitoring and recording crawl progress of the task, and, when not receiving feedback about completion of the task, re-pushing the task to the controlling end, wherein the crawling end acquires the task and to send data of the task to the controlling end via the network,
   the controlling end assigns a number to the task, defines a timeout period for the task, generates a task-distributing event, and stores timestamp data of distribution of the task,
   the controlling end distributes distribution of the task to the task monitoring module and the crawling end, so that the task monitoring module stores the number of the task, a timeout period of the task and timestamp data of the distribution of the task, and marks a present task as a task under execution, and
   the crawling end performs corresponding crawling logic to a crawl task, to finish data crawl, and sends information about completion of the task to the controlling end, and the controlling end stores a crawl result of the task, generates a task success event, and sends information about completion of the task to the task monitoring module, and the task monitoring module deletes the data of the task, or
   when the crawling end fails to complete data crawl, and when the task monitoring module has not received the information about completion of the task, a task-monitoring thread performs traversal on the data of the task, compares the timestamp data of the distribution of the task and a present timestamp of the system, and re-pushes the task that has not provided feedback to a crawl sequence of the controlling end, thereby repeating the task until required data crawl is completed.

2. The task-crawling system of claim 1, wherein the controlling end comprises a database for storing data of creation of the task, using Redis to store data of the task and crawl data of sequence, and using MySql to store the crawl result of the crawl task.

3. A task-crawling method for a distributed crawler system, comprising at least the following steps:
   (1) using a crawling end to acquire a task and to send data of the task to a controlling end via a network;
   (2) using the controlling end to assign a number to the task, to define a timeout period for the task, to generate a task-distributing event, and to store timestamp data of distribution of the task;
   (3) distributing distribution of the task to a task monitoring module and the crawling end, so that the task monitoring module processes the task using a processor thereof and stores a the number of the task, a timeout period of the task and timestamp data of the distribution of the task in a data-storing device thereof, and marks a present task as a task under execution; and
   (4) using the task monitoring module to set crawl time for the task, and to monitor and record crawl prowess of the task;
   (5) using the crawling end to perform corresponding crawling logic to a crawl task, to finish data crawl, and to send information about completion of the task to the controlling end, using the controlling end to store a crawl result of the task, to generate a task success event, and to send information about completion of the task to the task monitoring module, and using the task monitoring module to delete the data of the task; and
   (6) when the crawling end fails to complete data crawl, and when the task monitoring module has not received the information about completion of the task, using a task-monitoring thread to perform traversal on the data of the task, to compare the timestamp data of the distribution of the task and a present timestamp of the system, and to re-push the task that has not provided feedback to a crawl sequence of the controlling end, thereby repeating the task until required data crawl is completed.

* * * * *